April 7, 1959 A. J. FISHER 2,881,316

CRYSTAL-TUNED OSCILLATORS

Filed June 2, 1955

INVENTOR.
ALAN J. FISHER

BY

Harry M. Saragovitz
ATTORNEY

United States Patent Office 2,881,316

Patented Apr. 7, 1959

2,881,316

CRYSTAL-TUNED OSCILLATORS

Alan J. Fisher, Eatontown, N.J., assignor to the United States of America as represented by the Secretary of the Army Application June 2, 1955, Serial No. 512,909

11 Claims. (Cl. 250—36)

(Granted under Title 35, U. S. Code (1952), sec. 266)

The invention described herein may be manufactured and used by or for the Government for governmental purposes, without the payment of any royalty thereon.

My invention relates to crystal tuned oscillators, particularly of the type in which oscillating frequency may be changed with a minimum of adjustment.

In prior circuits of this type, a change in the oscillating frequency requires not only the insertion of a crystal tuned to the new frequency, but also requires an adjustment of the other circuit parameters.

It is an object of the invention to provide a circuit of this type in which a change in frequency over a predetermined range requires nothing more than the insertion of a crystal tuned to the new frequency.

For a better understanding of the invention, together with other and further objects thereof, reference is had to the following description, taken in connection with the accompanying drawing, in which.

Figure 1:
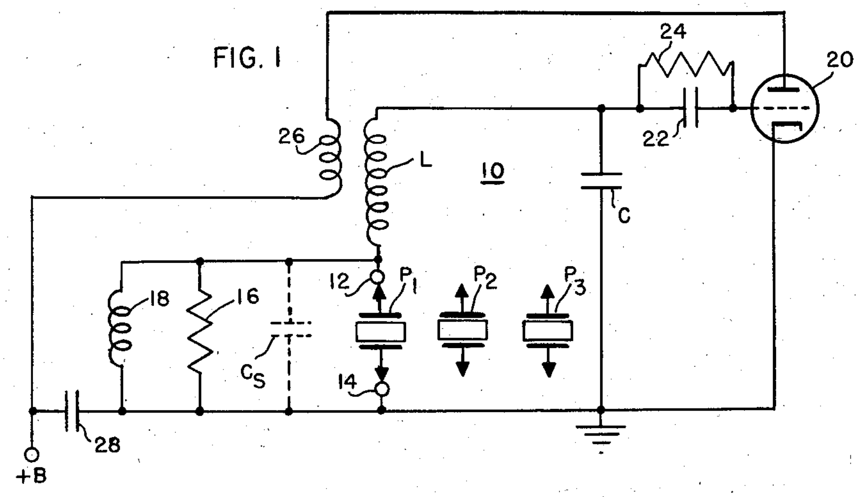
Fig. 1 is a schematic circuit of an oscillator incorporating my invention.

Fig. 1 shows the resonant circuit 10 of this invention incorporated in a conventional oscillator. The resonant circuit 10 comprises an inductive arm including an inductance L connected in series with one of a plurality of selectively-insertible piezoelectric crystals P1, P2, and P3, tuned to different frequencies. Connected in parallel with the inductive arm is a capacitative arm comprising a capacitor C. The natural resonant frequency of the circuit 10 is largely determined by the inductance L and capacitance C. Crystal P1 is preferably designed to be resonant to the same frequency, but within a predetermined range determined by the L/C ratio and other factors which determine the Q of the circuit, the resonant frequency of the crystal can be changed and the entire resonant circuit will resonate near the new resonant frequency without any adjustment of the other circuit parameters. Thus crystal P1 can be removed from plug-in terminals 12 and 14, and crystal P2 or P3, tuned to other frequencies in said predetermined range, plugged in to change the operating frequency of the circuit. Any other type of switching arrangement for selecting crystals can be used. Although only three crystals are shown, any number of crystals can be used within the given range.

In parallel with the crystal are connected a resistance 16 and an inductance 18 for purposes to be hereinafter explained. The output terminals of resonant circuit 10 are connected between the grid and cathode of an electron tube 20, through a blocking condenser 22, shunted a grid leak 24. The plate of tube 20 is coupled to circuit 10 through a tickler coil 26 coupled to coil L, and a blocking condenser 28 to provide sufficient regenerative feedback to cause the circuit to generate sustained oscillations. Any other suitable type of feedback arrangement, e.g., a Hartley or Colpitts circuit, may be used.

Figure 2:
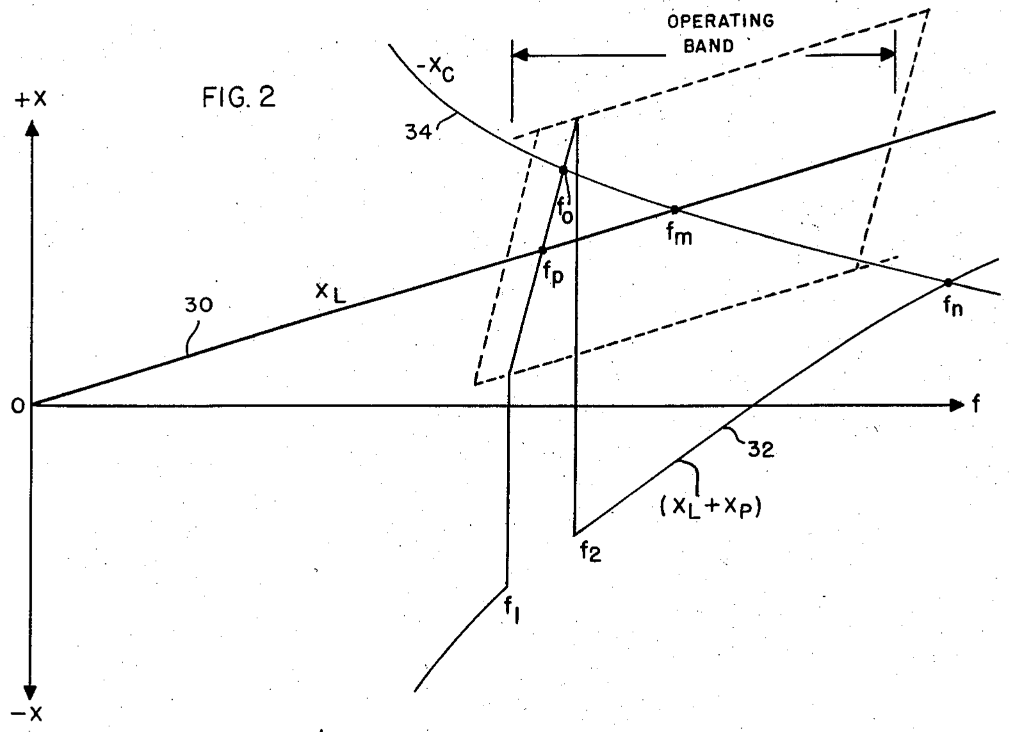
Fig. 2 is a series of curves illustrating the operation of my invention.

Considering now the operation of the circuit, reference is made to Fig. 2 in which the reactances of the elements of resonant circuit 10 are plotted as a function of frequency.

Curve 30 indicates the reactance $X_L$ of coil L. Curve 32 indicates the reactance of the inductive branch $X_L+X_P$, where $X_P$ is the reactance of the crystal. The resonant frequency of the crystal is $f_P$. A crystal is capable of vibrating, and thereby synthesizing electrical reactance, only near its resonant frequency. The frequency limits of vibration are shown as $f_1$ and $f_2$. The curve outside of the $f_1$ to $f_2$ region is simply the reactance of L and $C_S$ in series. At $f_P$ the crystal reactance is zero and the net reactance of the inductive branch is $X_L$. At a frequency near $f_P$ the reactance of the inductive branch is approximately $X_L$ plus whatever dynamic reactance arises from the off-resonance vibration of the crystal. This is so because the dynamic reactance is generally small compared to $X_S$ which is the reactance produced by the static capacitance $C_S$ across the crystal electrode and its holder. The reactance of the capacitive branch $X_c$, is indicated by curve 34. At a frequency such as $f_0$ the reactance of the two branches are equal and opposite so that anti-resonance is exhibited at the terminals of the resonant circuit. When the crystal is replaced by one having its resonance anywhere within the operating band indicated by the dotted parallelogram, the plot of the crystal's dynamic reactance will intersect the plot of $-X_c$, the condition for resonance. In the special case where $f_P=f_m$, the crystal does not supply reactance. It operates at its resonant frequency for anti-resonance to appear at the terminals of the resonant circuit 10. If $f_P$ is greater than $f_m$, the crystal must supply capacitive reactance and operate below its natural frequency. If $f_P$ is less than $f_m$ the crystal must supply inductive reactance and operate above its natural frequency. For the purpose of illustration the plot $X_L+X_P$ is shown expanded in the $f_1$ to $f_2$ region. Actually, the slope of this curve is very steep because of the extremely large L/C ratio of a crystal. It can be seen that this causes the difference between $f_P$ and $f_0$ to become very small.

In the above explanation the intersection of the $X_L+X_P$ and the $-X_c$ plots at $f_n$ was ignored. This intersection constitutes an unwanted anti-resonant frequency at the terminals of the resonant circuit 10. In reality, the oscillator will oscillate at this parasitic frequency rather than the intended frequency $f_0$, or both frequencies may be present. Oscillation at $f_n$ may be prevented by causing excessive resistance to be effective in the circuit at this frequency. This is accomplished by inductance 18 and resistance 16 shunted across the crystal terminals. The inductance 18 is proportioned so that it resonates with $C_S$ at the parasitic frequency $f_n$. The resistance 16 incidentally broadens the resonance curve to embrace changes in $f_n$ caused by variations in $C_S$ from crystal to crystal. This arrangement causes the impedance across the crystal terminals to be mostly resistive and medium in magnitude throughout the operating band except between $f_1$ and $f_2$. The added resistance 16 is mainly active in the circuit when the crystal is not vibrating and thus can cause unwanted resonant conditions to be too low in impedance to sustain oscillations. Between $f_1$ and $f_2$ the impedance across the crystal is substantially the same as originally described. If L and C are changes so that their L/C ratio is reduced, the pulling of the crystal $(f_0-f_P)$ will be reduced, or as an alternative the operating band may be extended with the same reduction in pulling. If the L/C ratio is made too small, then the resistive component of the crystal may make the resonant circuit impedance too low for practical applications.

A circuit designed to function as above described provides a crystal oscillator which is automatically tuned by simply inserting a crystal of the desired frequency into the circuit. It has all of the advantages of conventional crystal oscillators without the disadvantage of one or more manual tuning adjustments. The method may be applied to most conventional oscillators such as the Hartley, Colpitts and tickler feedback circuits.

Merely for purposes of illustration, an example of a practical embodiment of the invention will now be given. In this embodiment the crystals are type CR-23 ranging in frequency from 42.7 to 51.1 megacycles. Tube 20 is a subminiature type 6051. Resistor 16 is 1200 ohms and inductance 18 is 1.0 microhenry. Inductance L is 0.9 microhenry and capacity C is 13 micromicrofarads so that the natural frequency is 46.8 megacycles, the geometric mean of the frequency band. In practice, it was found that the crystals resonant near the edges of the frequency band were pulled less than one kilocycle from their natural frequencies.

Figure 3:
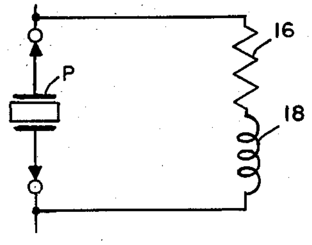
Fig. 3 is a schematic circuit illustrating a modification of my invention.

Fig. 3 shows a variation of the circuit in Fig. 1. Here, resistor 16 and inductance 18 are connected in series across the crystal P. The operation of the two circuits is substantially the same.

It should be noted that the operation of the above circuit is based upon the fact that the Q of the crystal, i.e., the ratio of inductive reactance to resistance of the crystal is considerably higher than the Q of the remainder of the resonant circuit. Accordingly, similar operation will result if for the crystal there is substituted any equivalent thereof, i.e., any resonant circuit element having a Q which is considerably higher than that of the remainder of the circuit. Thus a magnetostrictive oscillator is another form of electromechanical vibrator which may be used.

Use of a magnetostrictive oscillator would require a modification of the parasitic oscillation eliminating circuit. In a crystal, the static capacity $C_S$ requires neutralization. With a magnetostrictive oscillator there may be considerable static inductance which may require neutralization. This may be done by adding capacity across the terminals thereof to resonate said static inductance to the parasitic oscillation frequency.

Other changes may be made without departing from the true spirit and scope of the invention, and it is aimed in the appended claims to cover all such modifications.

I claim:

1. A tuning system comprising inductive and capacitative reactance arms connected in parallel to form a parallel-resonant circuit resonant at a predetermined frequency, and means to tune said circuit to any one of a number of frequencies within a predetermined frequency range encompassing said predetermined frequency, said means comprising means to insert one of a number of electromechanical vibrators, each having a Q which is considerably higher than the Q of the remainder of said circuit and respectively tuned to different frequencies within said range, in series with the reactance in one of said arms, the ratio of the Q of each of said vibrators with respect to the Q of the remainder of said resonant circuit being high enough to permit said circuit to be tuned to any frequency in said predetermined range solely by insertion of one of said vibrators, and means to neutralize the static reactance of said vibrators at a predetermined frequency outside said frequency range.

2. A tuning system comprising inductive and capacitative reactance arms connected in parallel to form a parallel-resonant circuit resonant at a predetermined frequency, and means to tune said circuit to any one of a number of frequencies within a predetermined frequency range encompassing said predetermined frequency, said means comprising means to insert one of a number of electromechanical vibrators, each having a Q which is considerably higher than the Q of the remainder of said circuit and respectively tuned to different frequencies within said range, in series with the reactance in one of said arms, the ratio of the Q of each of of said vibrators with respect to the Q of the remainder of said resonant circuit being high enough to permit said circuit to be tuned to any frequency in said predetermined range solely by insertion of one of said vibrators, the static reactance of said vibrators tending to resonate with another reactance in said parallel-resonant circuit to cause the latter to oscillate at an undesired frequency and wherein there is provided means to neutralize said static reactance at said undesired frequency.

3. A tuning system as set forth in claim 2, wherein said resonant elements are piezoelectric crystals.

4. A tuning system comprising inductive and capacitative reactance arms connected in parallel to form a parallel-resonant circuit resonant at a predetermined frequency, and means to tune said circuit to any one of a number of frequencies within a predetermined frequency range encompassing said predetermined frequency, said means comprising means to insert one of a number of piezoelectric crystals, each having a Q which is considerably higher than the Q of the remainder of said circuit and respectively tuned to different frequencies within said range, in series with the reactance in one of said arms, the ratio of the Q of each of said crystals with respect to the Q of the remainder of said resonant circuit being high enough to permit said circuit to be tuned to any frequency in said predetermined range solely by insertion of one of said crystals, and means to neutralize the static capacity of said crystals at a predetermined frequency outside said frequency range at which said resonant circuit tends to oscillate.

5. A tuning system comprising inductive and capacitative reactance arms connected in parallel to form a parallel-resonant circuit resonant at a predetermined frequency, and means to tune said circuit to any one of a number of frequencies within a predetermined frequency range encompassing said predetermined frequency, said means comprising means to insert one of a number of piezoelectric crystals each having a Q which is considerably higher than the Q of the remainder of said circuit and respectively tuned to different frequencies within said range, in series with the reactance in one of said arms, the ratio of the Q of each of said crystals with respect to the Q of the remainder of said resonant circuit being high enough to permit said circuit to be tuned to any frequency in said predetermined range solely by insertion of one of said crystals, the static capacity of said crystals and an inductance in said resonant circuit tending to oscillate at a parasitic frequency, and means to neutralize said static capacity at said frequency.

6. A crystal-tuned oscillator comprising inductive and capacitative reactance arms connected in parallel to form a parallel-resonant circuit resonant at a predetermined frequency, and means to tune said circuit to any one of a number of frequencies within a predetermined range encompassing said predetermined frequency, said means comprising means to insert one of a number of piezoelectric crystals, respectively tuned to different frequencies within said range, in the inductive reactance arm, the ratio of inductance to capacity of said parallel-resonant circuit being low enough to permit said oscillator to be tuned to any frequency in said predetermined range solely by insertion of said crystals and without adjustment of any other parameter of said oscillator, said predetermined frequency being the geometric mean frequency of said range.

7. A crystal-tuned oscillator comprising inductive and capacitative reactance arms connected in parallel to form a parallel-resonant circuit resonant at predetermined frequency, and means to tune said circuit to any one of a number of frequencies within a predetermined range encompassing said predetermined frequency, said means comprising means to insert one of a number of piezoelectric crystals, respectively tuned to different frequencies within said range, in the inductive reactance arm, the ratio of inductance to capacity of said parallel-resonant circuit being low enough to permit said oscillator to be tuned to any frequency in said predetermined range solely by insertion of said crystals and without adjustment of any other parameter of said oscillator, an inductance connected across said crystal, said inductance forming with the static capacity of said crystal a circuit which is anti-resonant to a parasitic frequency at which said oscillator tends to oscillate due to said static capacity.

8. A crystal-tuned oscillator comprising inductive and capacitative reactance arms connected in parallel to form a parallel-resonant circuit resonant at predetermined frequency, and means to tune said circuit to any one of a number of frequencies within a predetermined range encompassing said predetermined frequency, said means comprising means to insert one of a number of piezoelectric crystals, respectively tuned to different frequencies within said range, in the inductive reactance arm, the ratio of inductance to capacity of said parallel-resonant circuit being low enough to permit said oscillator to be tuned to any frequency in said predetermined range solely by insertion of said crystals and without adjustment of any other parameter of said oscillator, and a resistance shunted across said crystal.

9. A crystal-tuned oscillator comprising inductive and capacitative reactance arms connected in parallel to form a parallel-resonant circuit resonant at predetermined frequency, and means to tune said circuit to any one of a number of frequencies within a predetermined range encompassing said predetermined frequency, said means comprising means to insert one of a number of piezoelectric crystals, respectively tuned to different frequencies within said range, in the inductive reactance arm, the ratio of inductance to capacity of said parallel-resonant circuit being low enough to permit said oscillator to be tuned to any frequency in said predetermined range solely by insertion of said crystals and without adjustment of any other parameter of said oscillator, a resistance and inductance connected across said crystal, said inductance forming with the static capacity of said crystal a circuit which is antiresonant to a frequency outside said predetermined range at which said oscillator tends to oscillate.

10. A crystal-tuned oscillator as set forth in claim 9, wherein said resistance and inductance are connected in parallel with said crystal.

11. A crystal-tuned oscillator as set forth in claim 10, wherein said resistance and inductance are connected in series across said crystal.

References Cited in the file of this patent

UNITED STATES PATENTS

| | | |
|---|---|---|
| 2,012,497 | Clapp | Aug. 27, 1935 |
| 2,297,889 | Hoffmann et al. | Oct. 6, 1942 |
| 2,486,355 | Bussard | Oct. 25, 1949 |

FOREIGN PATENTS

| | | |
|---|---|---|
| 298,007 | Italy | June 25, 1932 |
| 907,944 | France | Mar. 26, 1946 |
| 908,466 | France | Apr. 10, 1946 |
| 978,743 | France | Apr. 17, 1951 |